March 6, 1945.　　T. A. ANDERSON　　2,370,705
SLICING MACHINE
Filed April 30, 1942　　3 Sheets-Sheet 1
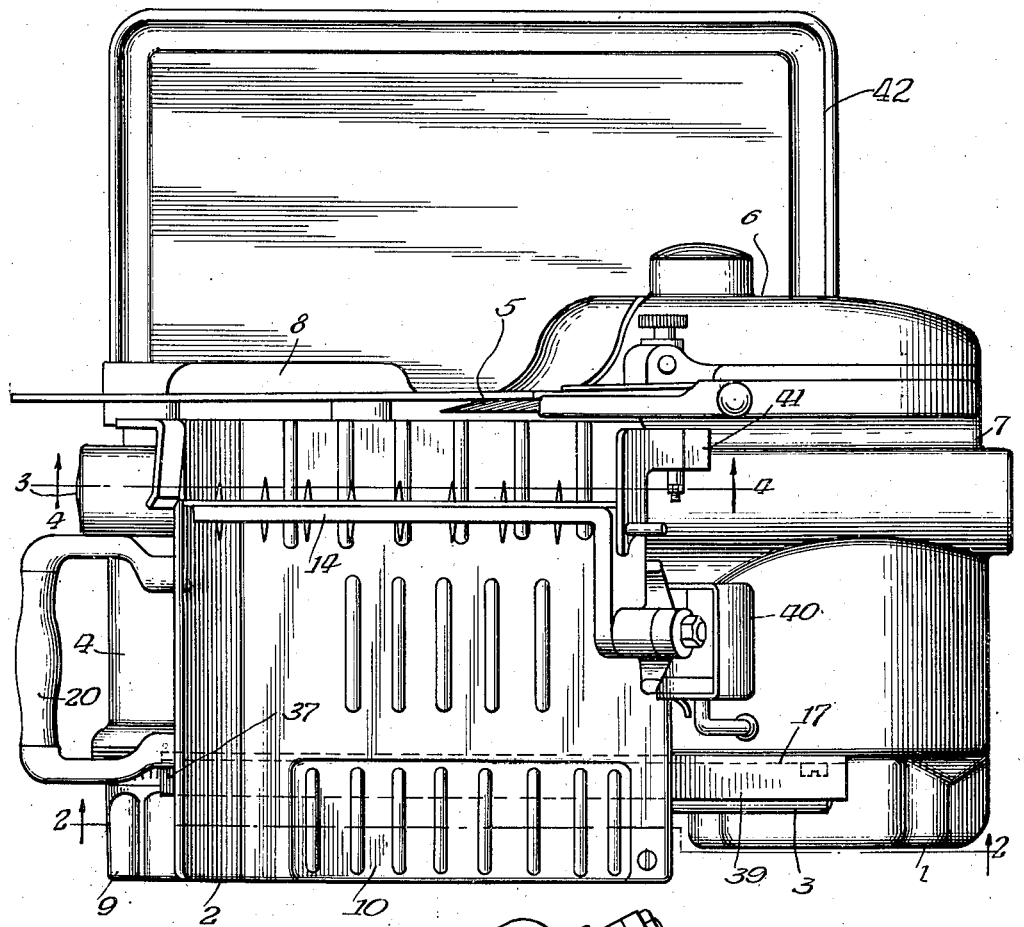
Inventor:-
Thure Allan Anderson.
By Spencer, Marzall, Johnston & Cook,
Attys.

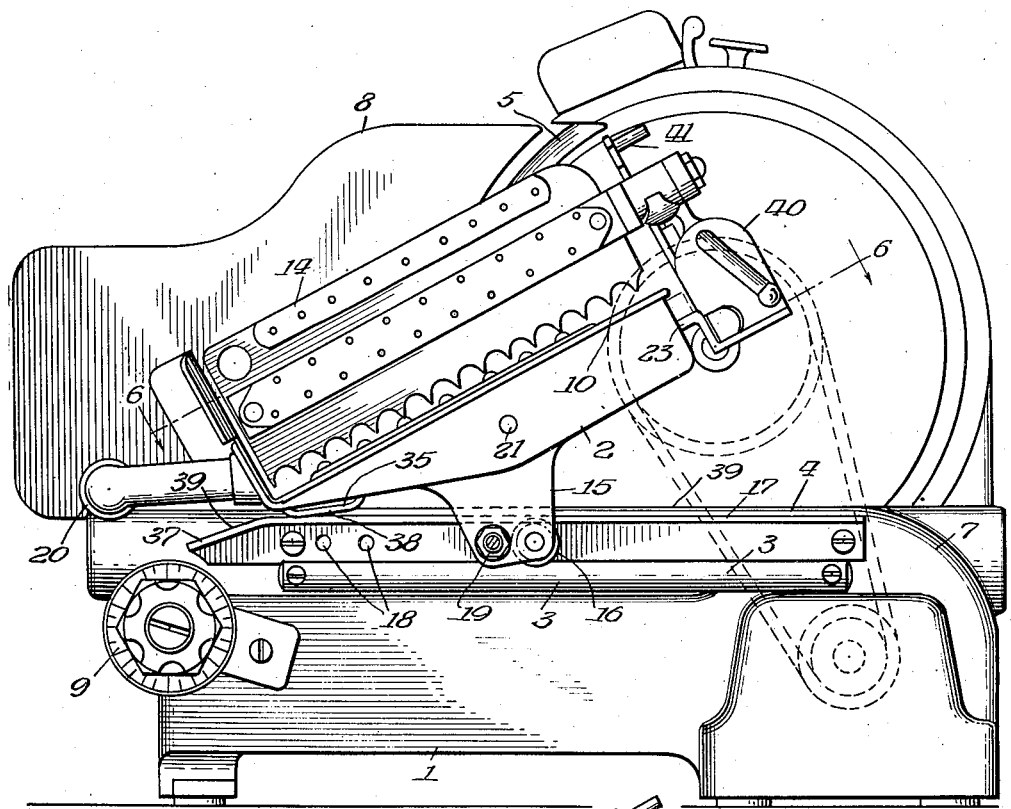
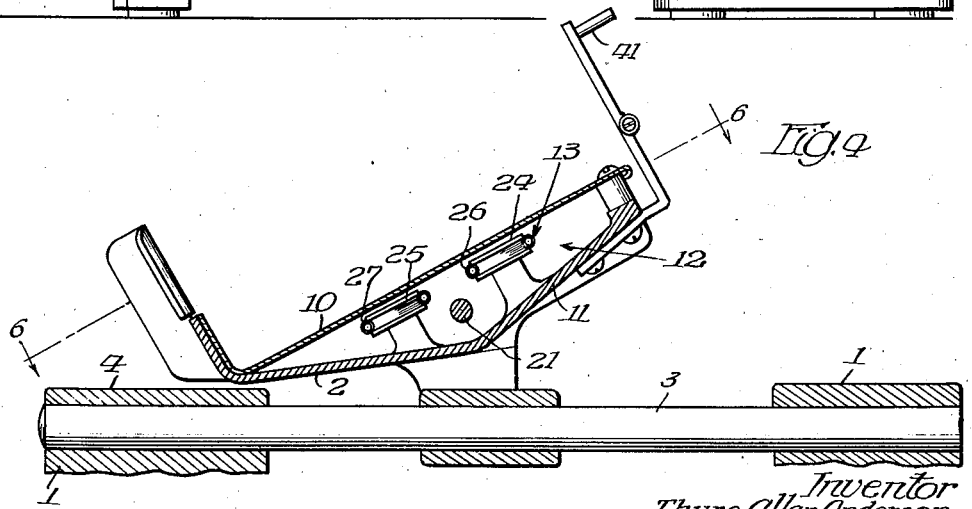

March 6, 1945. T. A. ANDERSON 2,370,705
SLICING MACHINE
Filed April 30, 1942 3 Sheets-Sheet 3

Inventor
Thure Allan Anderson
By Spencer, Marzall, Johnston & Cook
Attys

Patented Mar. 6, 1945

2,370,705

UNITED STATES PATENT OFFICE 2,370,705

SLICING MACHINE

Thure Allan Anderson, Des Plaines, Ill., assignor to U. S. Slicing Machine Company, La Porte, Ind., a corporation of Indiana Application April 30, 1942, Serial No. 441,128

1 Claim. (Cl. 146—102)

This invention relates to slicing machines, and particularly to means for feeding substance to the slicing knife. More specifically, the invention relates to means for feeding the substance mounted on the substance support to a gauge plate which is adapted to be set at various spaced distances in a plane parallel to the plane of the slicing knife so that slices of different thicknesses may be cut, and in this latter aspect the present invention relates to slicing machines whereby the substance is prevented from being pressed against the face of the slicing knife during the end of the forward and the beginning of the return stroke of the carriage in a manner somewhat taught in Patents Nos. 2,121,348, 2,121,349 and 2,121,350, all of which are assigned to the present assignee.

The primary object of the present invention is to provide a simplified, extremely economical and positive construction composed of few and simple parts to effect more positively the holding and releasing of the food pusher than the manner taught in the aforesaid patents.

Another object of the present invention is the provision of a brake mechanism which is adapted to be operated by simple mechanism and controlled at various positions depending upon the location of the carriage with respect to the base.

A further object of the invention is the provision of means cooperating with the food pusher and operating directly on a part of the food pusher operating mechanism so as to prevent the feed mechanism from operating the food pusher when the carriage is at a predetermined position, but allowing the mechanism to operate the food pusher to bring the substance against the substance plate when the carriage is in other predetermined positions.

A still further object of the invention is to provide a brake mechanism adapted for holding or releasing the food pusher mechanism when the pusher plate is at predetermined positions, the food pusher mechanism being released when the substance is opposite the gauge plate so that the substance will be pushed against the gauge plate to determine the slice thickness, the said mechanism being locked to prevent the urging action of the pusher from acting on the meat at the end of the forward stroke and the beginning of the return stroke so as to prevent excess smearing or rubbing of the substance against the face of the knife.

Still another object of the invention is the provision of a pivotally mounted brake element adapted to be maintained in locked position by a bar or other suitable element mounted on the base of the carriage frame so as to control the locking or braking action at predetermined points and to release the locking or braking action at other points to accomplish the above objects.

Numerous other objects and advantages will be apparent throughout the following specification.

The accompanying drawings illustrate a selected embodiment of the invention, and the views therein are as follows:

Fig. 1 is a detail top plan view of a slicing machine and embodying the invention.

Fig. 2 is a detail vertical sectional view on the line 2—2 of Fig. 1.

Fig. 3 is a detail side elevational view.

Fig. 4 is a detail vertical sectional view on the line 4—4 of Fig. 1.

Figure 5:
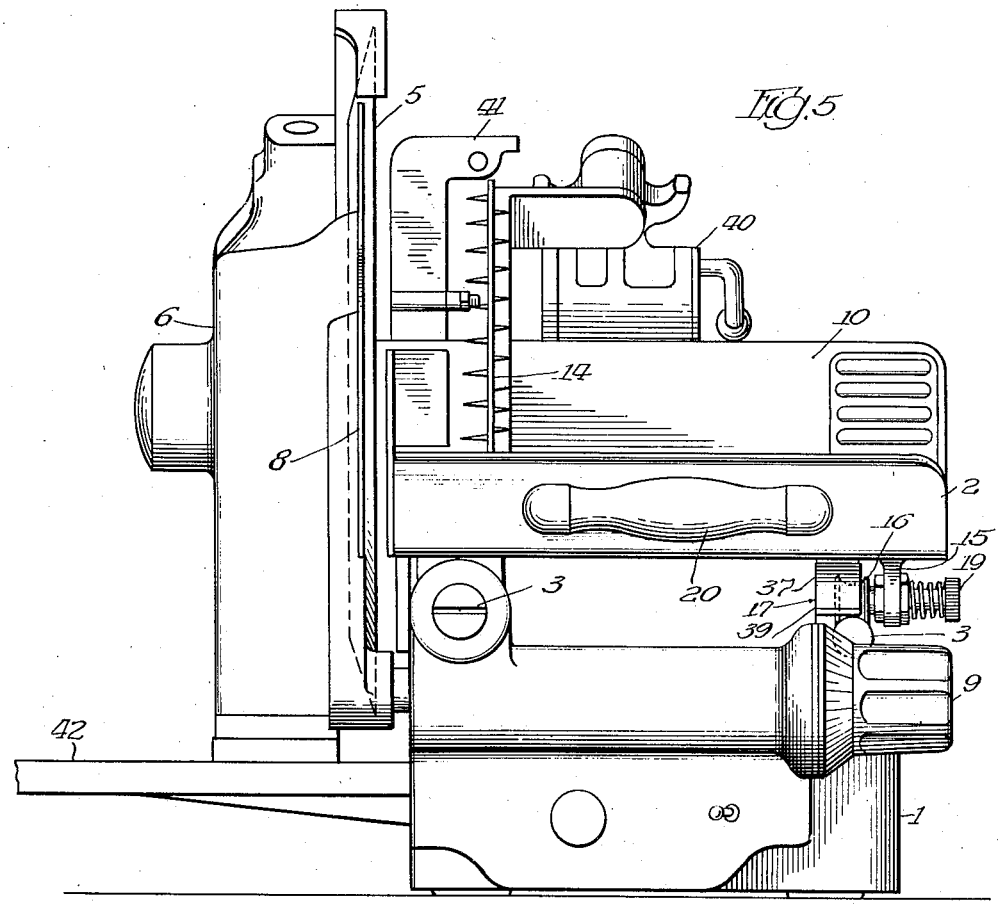
Fig. 5 is a detail front elevational view.

The particular slicing machine herein shown for the purpose of illustrating the invention comprises a base 1 over which a carriage 2 is adapted to be reciprocated in a rectilinear path. The carriage 2 is supported for movement on fixed guides 3 preferably mounted below the upper surface 4 of the base 1. A stationary rotatably mounted knife 5 is carried by a knife supporting bracket 6, the knife being rotated by a motor housed in the motor casing 7.

A gauge plate 8 is mounted to the left of the machine in a plane parallel to the vertical plane of the knife 5 and is movable laterally so that the substance supporting face of the gauge plate will always be in the plane parallel to the plane of the cutting knife 5. The gauge plate 8 is movable by means of an operating member or knob 9 to position properly the gauge plate with respect to the cutting blade of the knife. The gauge plate and the manner in which it is operated or controlled is well known in the art and therefore further description thereof will not be made.

The carriage 2 includes an upper food table or substance supporting surface 10 and a lower cooperating plate 11 providing a compartment or chamber 12 into which there is operatively mounted mechanism indicated generally by the numeral 13 for operating a food pusher plate 14. The carriage 2 is also provided with a downwardly extending flange 15 which is preferably made integral with the bottom part of the carriage. This extension or flange 15 carries a roller 16 which rolls on a rod 3 and beneath a flanged bar 17. The flanged bar 17 is provided with openings 18 to receive a spring pressed blocking plunger 19. The plunger 19 is adapted to engage the openings 18 to lock the carriage in position so that it will not be moved accidentally while the carriage is being loaded with substance or when the machine is being cleaned. This spring pressed plunger rod 19 is so constructed and arranged that when not adapted for engagement with an opening 18, such as during normal use of the slicing machine, the plunger may be retracted and locked in inoperative position so as to prevent engagement with the slots 18. However, by turning the knob on the plunger 19, the rod may be unlocked or unlatched so that it may be brought into operation for engagement with the openings 18 if and when desired.

The carriage may be reciprocated manually forwardly and rearwardly in a rectilinear path by means of the handle 20 attached to the forward side of the carriage.

Figure 6:
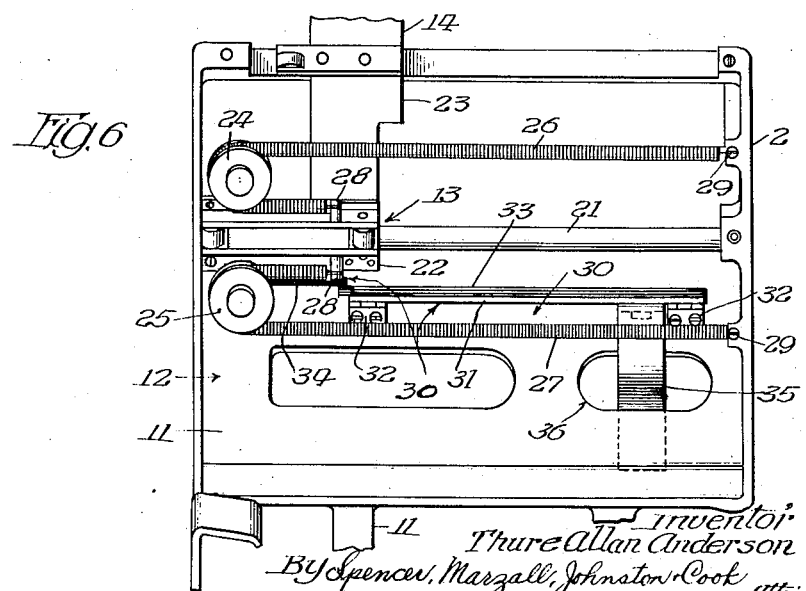
Fig. 6 is a detail plan section on the lines 6—6 of Figs. 2, 3 and 4.

The pusher plate operating mechanism includes a transverse rod 21 (Figs. 2 and 6) which is rigidly supported to the carriage in the compartment 12 between the upper and lower members 10 and 11 of the carriage, and this rod carries a slide bearing 22 for slidable movement thereon.

An element 23 is rigidly connected to the slide bearing 22 and supports the pusher plate 14. Rollers 24 and 25 are revolubly mounted on the upper surface of the bottom member 11 of the carriage over which flexible coiled springs 26 and 27, respectively, are trained. The one end of each of the springs is fastened to the slide bearing 22 as indicated at 28 (Fig. 6) and the other ends are fixed to a rigid part of the carriage, as indicated at 29. These springs therefore urge the pusher plate in a predetermined direction and provide the proper and necessary tension or urging action on the pusher plate so as to feed properly the substance to the gauge plate, because the tension on the substance is less as the size of the substance decreases. Therefore, the pusher plate is provided with greater spring pressure where the substance is large because greater urging action is needed to move the larger and heavier piece of substance. However, when the substance is smaller, the urging action of the springs need not be as great, because only a smaller and less weight substance is to be moved.

Spring pressed pusher plates of the type employing a constantly urging spring are conventional in the art. However, there is usually a pressure on the substance during the complete forward and rearward stroke of the carriage. The three prior-mentioned patents have endeavored to overcome the continuous pressure during both the forward and rearward stroke of the carriage and tend to prevent the smearing or larding of the knife, as well as to tend to overcome bleeding of the meat.

The present invention, however, accomplishes the results in a more perfect manner by means of very simple, economical and positively operating means. The latter means comprises a brake element 30 consisting of a strap or bar 31 (Fig. 6), which is pivoted by means of hinges 32 to the base 11 of the carriage frame. This strap or bar 31 is provided with friction material 33, such as brake lining, and is adapted to cooperate with a brake shoe 34 having a friction surface, such as brake lining, mounted on the slide bearing 22, whereby when the two braking surfaces 33 and 34 are brought together into braking relationship, the spring action on the slide bearing 22 is neutralized.

An arm or lever 35 is fixed to the brake element 30, and is adapted to shift the brake element 30 into and out of braking engagement with the brake shoe 34 on the slide bearing 22. The arm or lever 35 extends through an opening 36 (Fig. 2), in the lower member 11 of the carriage, and this arm or lever 35 has a lower portion 38 adapted for engagement with the upper surface of the flanged bar 17. The bar 17 is provided with a cam nose or surface 37 over which the lower part 38 (Fig. 2) of the lever 35 is adapted to ride. The cam surface 37 is positioned opposite the gauge plate 8 so that upon the return of the carriage at a point near the operator, the arm 35 will ride upon the surface 37 and drop off the upper surface 39 of the angle member 17 to release the braking action on the slide bearing 22, whereby the springs 26 and 27 will be free to urge the food pusher, and consequently the substance towards the gauge plate the proper amount.

During the forward cutting stroke away from the operator, the arm or lever 35 will be caused to ride up the cam surface 37 onto the surface 39 and exert a pressure on the braking element 31 bringing it into braking engagement with the brake shoe 34. The slide bearing 22, therefore, is positively locked during the remainder of the forward movement of the carriage, as well as during a greater part of the return movement of the carriage, by the lever 35 riding on the surface 39. This locking or braking action continues until the lever arm 35 rides off the cam surface 39, as the carriage returns at or near the end of the return stroke. The pressure on the lever 35 is released when the lower part 38 rides or drops off the surface 39 onto the surace 37 because the lever is then no longer held up by the surface 39. When there is no longer any pressure on the lever arm 35, the lever arm will drop by gravity and permit the brake element or bar 31 to swing on the hinges 32, thereby releasing the braking action of the element 31 against the shoe 34.

The braking of the element 31 acting upon shoe 34 on the slide bearing 22 locks the food pusher in position and prevents action of the pusher plate to force the substance against the knife during the forward cutting of the substance, as well as during the return stroke. Rubbing action of the substance against the face of the knife during both the forward and rearward stroke is therefore eliminated, and larding or smearing of the knife and bleeding of the meat are prevented. The construction is such however, that the springs 27 are free to exert an action against the substance only long enough for the substance to move against the gauge plate while the substance is opposite the gauge plate. After the substance is pushed against the gauge plate and the carriage moved forwardly, all further urging action on the substance is prevented during both the continued forward and rearward strokes of the carriage.

The carriage is provided with a locking member 40 to hold the food pusher in its inoperative position, which would be at the extreme right, looking at Fig. 5, so as to permit the substance supporting surface on the carriage to be cleaned or loaded.

The carriage may also be provided with a stop member 41 which is adapted to engage a rigid part of the slicing machine so as to prevent the food pusher from fouling the knife.

A slice receiving tray 42 may be arranged at the left hand side of the slicing knife to receive slices as they are cut from the substance.

In operation, substance is placed on the substance supporting surface of the carriage at a point opposite the gauge plate after the gauge plate has been first set to determine the thickness of the slices to be cut. The pusher plate is then released to engage the substance and push it against the gauge plate. The motor is then operated to rotate the knife at which time the parts are in proper working order and in position to effect the slice operation. As the carriage is moved forwardly to effect the slicing operation, the cam operated lever 35 engages the cam nose 37, bringing the braking element or bar 31 into braking or locking engagement with the shoe 34 at which time the slide bearing 22 is prevented from being urged by the spring. The continued forward movement of the carriage will cause a slice to be cut by the rotating knife and deposited on the slice receiving tray 42. However, inasmuch as the braking elements are still in braking engagement, there will be no urging action of the springs transmitted to the substance, and therefore the substance will be prevented from rubbing against the knife. The parts are maintained in locked non-urging position until the end of the return stroke, at which time the cam operated lever or arm 35 will leave the surface 39. The arm 35 after leaving the surface 39 drops because of its own weight and thus permits brake element 31 to move out of physical braking contact with the brake shoe 34. The slide bearing 22 therefore is free to be acted upon by the springs 26 and 27, at which time the substance is again moved against the surface of the gauge plate and, the operation is ready to be repeated again.

The lever 35 is preferably made of relatively resilient material so that its resiliency firmly presses the braking surfaces together while at the same time serving to equalize or stabilize the pressure of the two braking surfaces 33 and 34 when they press against each other.

While the lever 35 has been heretofore described as being gravity operated, its movement in a downward direction may be accentuated after it leaves the surface 39. This accentuation may be effected by means of a compressed spring 43, Fig. 2. This spring 43 is thus adapted to exert a downward pressure against the upper surface of the arm or lever 35, tending to force the member 33 out of contacting relationship with the brake shoe 34 when the lever arm 35 is opposite the cam surface 37. The lever or arm 35 therefore may either drop down the cam surface 37 by gravity or it may be forced or assisted in moving downwardly by means of the spring 43.

The invention provides a positively operating braking element of few and simple parts capable of being readily and economically manufactured. The braking elements may be applied to existing machines as well as new machines with very little effort and at small cost. The parts are few and simple in construction, are strong and durable and are not likely to get out of order.

Changes may be made in the form, construction and arrangement of the parts without departing from the spirit of the invention or sacrificing any of its advantages, and the right is hereby reserved to make all such changes as fairly fall within the scope of the following claim.

The invention is hereby claimed as follows:

In a meat slicing machine embodying a gauge plate, a rotary slicing knife arranged at one side of the gauge plate substantially parallel thereto and a meat carrying carriage reciprocable across the face of the gauge plate and the knife for the slicing operation, a relatively movable feed device on the carriage, spring means normally urging the feed device in a direction to contact substance on the feed device with the gauge plate, a brake element comprising a strip of brake material and a friction brake shoe for locking and releasing the feed device, a hingedly mounted bar for supporting said strip of brake material, said bar and brake material being movable in one direction against the shoe to lock the feed device against movement and in a counter direction to release the same for movement, and means for moving said bar to move the brake material against the shoe to effect a locking action before each slicing operation, said means permitting release of the material from the shoe to effect releasing of the feed device after each slicing operation.

THURE ALLAN ANDERSON.